US009384200B1

(12) United States Patent
Batchu et al.

(10) Patent No.: US 9,384,200 B1
(45) Date of Patent: Jul. 5, 2016

(54) PARALLELIZING BACKUP AND RESTORE FOR NETWORK-ATTACHED STORAGE

(71) Applicant: EMC Corporation, Hopkinton, MA (US)

(72) Inventors: Ravi V. Batchu, Cupertino, CA (US); Suchit Kaura, San Ramon, CA (US); Hymanand Nellore, Foster City, CA (US); Hsing Yuan, Palo Alto, CA (US); Jeff Miller, Menlo Park, CA (US); Sandeep Joshi, Campbell, CA (US)

(73) Assignee: EMC Corporation, Hopkinton, MA (US)

( * ) Notice: Subject to any disclaimer, the term of this patent is extended or adjusted under 35 U.S.C. 154(b) by 24 days.

(21) Appl. No.: 13/723,604

(22) Filed: Dec. 21, 2012

(51) Int. Cl.
*G06F 17/30* (2006.01)
*G06F 15/16* (2006.01)

(52) U.S. Cl.
CPC .................. *G06F 17/30091* (2013.01)

(58) Field of Classification Search
CPC ............. G06F 17/30194; G06F 12/00; G06F 12/0246; G06F 17/30; G06F 17/30067; G06F 21/602; G06F 2212/7201; G06F 3/06; G06F 3/067; G06F 11/1464; G06F 12/02; G06F 12/0804; G06F 15/16; G06F 15/177; G06F 17/30082; G06F 17/30091; G06F 17/30156; G06F 17/30442; G06F 17/30575; G06F 21/00; G06F 3/0605; G06F 3/0619; G06F 3/0626; G06F 3/0656; G06F 3/0688; G06F 11/00; G06F 11/1008; G06F 11/108; G06F 11/1458; G06F 11/1471; G06F 11/1474; G06F 11/1666; G06F 11/3485; G06F 11/36; G06F 11/3664; G06F 12/0253; G06F 12/0871; G06F 12/0891; G06F 12/10; G06F 12/12; G06F 13/00; G06F 13/14; G06F 13/4004; G06F 13/42; G06F 15/167; G06F 15/173; G06F 15/17331; G06F 15/18; G06F 17/3007; G06F 17/30073; G06F 17/30153; G06F 17/302; G06F 17/30215; G06F 17/30289; G06F 17/303; G06F 17/30315; G06F 17/30345; G06F 17/30368; G06F 17/30371; G06F 17/30528; G06F 17/3053; G06F 17/30536; G06F 17/30581; G06F 17/30584; G06F 17/30587; G06F 17/30864; G06F 17/30867; G06F 19/22; G06F 1/12; G06F 1/16; G06F 1/163; G06F 1/183; G06F 1/30; G06F 21/44; G06F 21/552; G06F 21/561; G06F 21/57; G06F 21/606; G06F 21/62; G06F 21/6218; G06F 21/6227; G06F 2201/82; G06F 2211/103; G06F 2212/202; G06F 2212/222; G06F 2212/7205; G06F 2212/7207; G06F 2213/0042; G06F 2221/2107; G06F 2221/2117; G06F 2221/2119; G06F 2221/2141; G06F 3/005; G06F 3/011; G06F 3/013; G06F 3/017; G06F 3/0604; G06F 3/0608; G06F 3/0613; G06F 3/0631; G06F 3/0635; G06F 3/064; G06F 3/0641; G06F 3/0644; G06F 3/0664; G06F 3/0671; G06F 3/0679; G06F 3/0685; G06F 3/1415; G06F 8/00; G06F 9/45516; G06F 9/45537; G06F 9/46; G06F 9/5027; G06F 9/5072; G06F 9/54
See application file for complete search history.

(56) References Cited

U.S. PATENT DOCUMENTS 6,487,561 B1 * 11/2002 Ofek et al.
7,640,262 B1 * 12/2009 Beaverson et al.

(Continued)

*Primary Examiner* — Alex Gofman

(57) ABSTRACT

The subject disclosure is directed towards the parallel backing up of a file system. A file system tree structure is walked by parallel workers that write file system data to data storage devices in parallel streams. Work assigned to one worker may be split to an idle worker to provide parallel operation. Relationship data that maintains relationships between the streams is persisted (e.g., via reference data inserted into the streams) so that a restore mechanism is able to stitch the streams together back into the file system data. Also persisted is location data that maintains storage locations of the streams. A file's data also may be written into parallel streams.

20 Claims, 8 Drawing Sheets

(56) References Cited

U.S. PATENT DOCUMENTS

| | | | |
|---|---|---|---|
| 7,650,341 B1* | 1/2010 | Oratovsky et al. | 707/999.01 |
| 2003/0110203 A1* | 6/2003 | Brenner et al. | 709/103 |
| 2009/0013129 A1* | 1/2009 | Bondurant | 711/115 |
| 2009/0327377 A1* | 12/2009 | Ylonen | 707/206 |
| 2011/0016153 A1* | 1/2011 | Atta et al. | 707/797 |
| 2011/0047409 A1* | 2/2011 | Hur | G06F 11/1456 714/6.1 |
| 2011/0106764 A1* | 5/2011 | Wu et al. | 707/639 |
| 2011/0196899 A1* | 8/2011 | Hughes et al. | 707/809 |
| 2012/0131061 A1* | 5/2012 | Cookson et al. | 707/797 |
| 2013/0212068 A1* | 8/2013 | Talius et al. | 707/639 |

\* cited by examiner

PARALLELIZING BACKUP AND RESTORE FOR NETWORK-ATTACHED STORAGE

BACKGROUND

Network-attached storage (NAS) is increasingly being used by enterprises to store their data. Scale-out NAS refers to NAS solutions in which the file system may span any number of physical nodes. In general, Scale-out NAS enables file systems that are orders of magnitudes larger than traditional NAS.

However, having such large file systems results in a file system backup operation taking a very long time. In general, this is because current backup techniques, developed for traditional NAS, are inherently sequential in nature and therefore do not scale up for Scale-out NAS environments.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards parallelizing data backup and restore, particularly for use in Scale-out network-attached storage (NAS). In one aspect, data in a file system (e.g., a snap of the file system) are read in parallel and written in parallel to multiple backup devices. Further, when a restore is needed, data on backup devices may be read in parallel and written back to a distributed file system in parallel.

To this end, to perform a backup in one embodiment, multiple worker processes perform the work needed for the backup in parallel tree walks of various directory slices. When a worker process does not have any work, the idle process requests additional work from a coordinator process, which takes part of the directory slice (the work) away from another process, e.g., the coordinator reassigns a directory slice from a current worker to the idle worker in a splitting operation.

The parallel processing results in multiple streams (sequence of bytes sent to the backup device or devices) from the parallel workers, with each stream tagged with a unique stream identifier (StreamID). The identifier is tracked along with other stream locations for stitching back together the multiple streams into the file data, analogous to if an "original" stream was maintained for restore. Streams may include a reference to one or more other streams spawned therefrom as a result of the splitting operation.

Restore may be initiated by having a process restore from an initial stream, e.g., stream "0." On encountering a reference to another stream, a new process is spawned, whereby the data are recovered by a parallel process from the newly referenced stream. By repeating the strategy of spawning a new process each time a reference to a stream is encountered, and because of the way the backup stream (actually set of streams) was generated, any time a tree node is restored, any ancestor nodes in the directory tree already have been restored.

It should be understood that any of the examples herein are non-limiting. For instance, the examples herein generally refer to having multiple processes perform the backup and restore operations, however it is understood that one or more processes may have multiple threads that may be used for at least some of the parallel operations, and thus parallel processes and threads may be used somewhat interchangeably. Further, while a full backup is primarily described, incremental backup solutions may benefit from the same or similar technology. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data storage in general.

Figure 1:
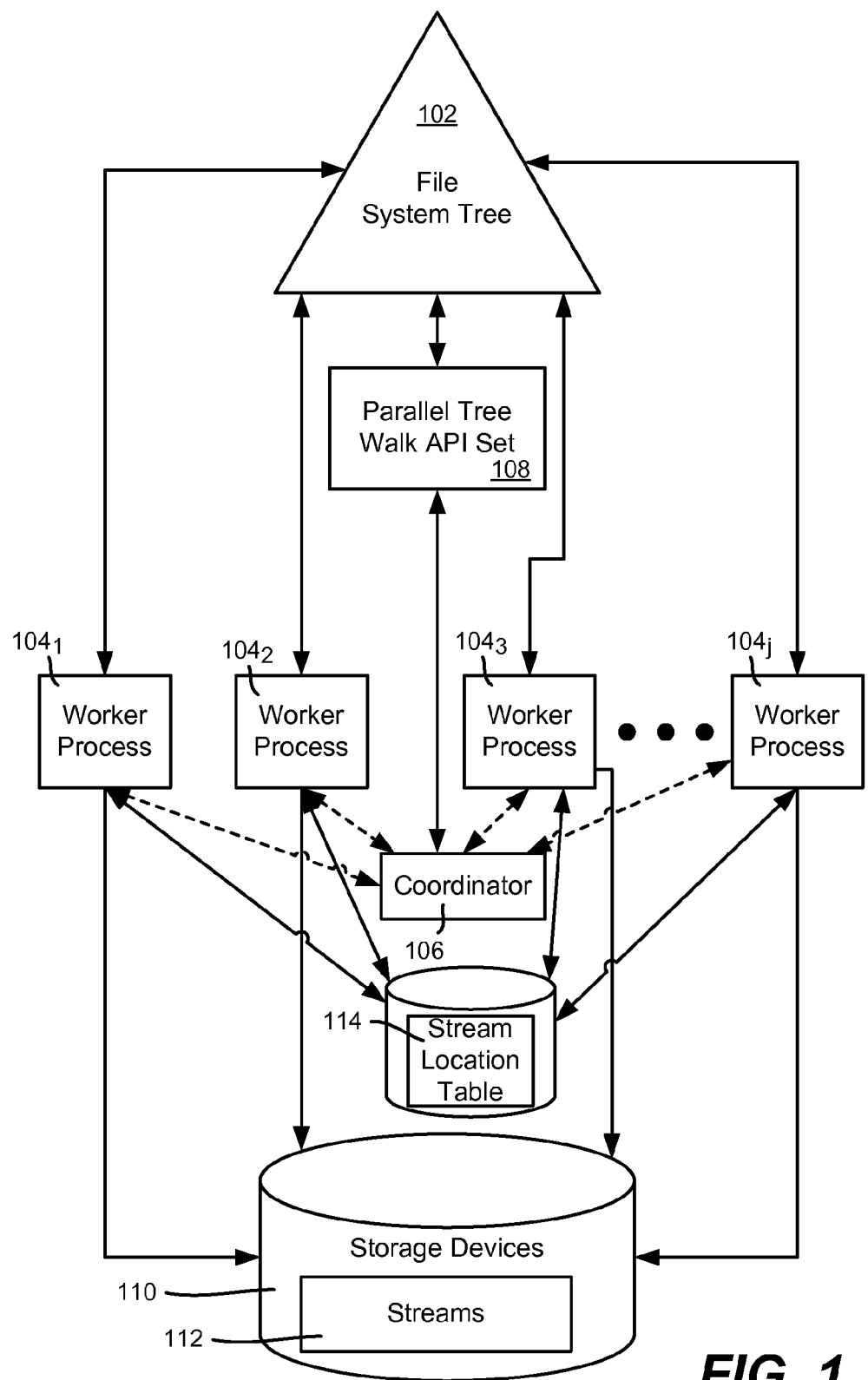
FIG. 1 is a block diagram showing various example components that may be used to parallelize backup of a file system, according to one example embodiment.

FIG. 1 shows a block diagram in which backup is performed on a file system tree 102 (or subtree), corresponding to a snap of the file system, via a plurality of parallel worker processes $104_1$-$104_j$, (or simply "workers"), where j is any practical number of processes. Indeed, there is no fixed maximum number of processes to which backup can be parallelized; for example, as the number of nodes or amount of data grows, backups may be parallelized more via additional processes to keep the backup (and consequently the restore) time to a relatively short duration.

As described herein, a coordinator 106 (e.g., a separate process) assigns the worker processes part of the tree to walk in parallel. Initially one or more worker processes are assigned work items comprising one or more directory slices corresponding to the entire tree to backup, with subsequent splitting of the work items (subparts of the tree) to other worker processes performed, as described below. Typically, the tree walk starts with a single worker, with splitting to other workers occurring from there. Backup is performed as each worker process walks its respective part of the tree, in parallel, each performing a depth first traversal. Note that a load balancing, fault tolerant implementation of a parallel tree walk currently exists in the OneFS® EMC²® Isilon® SyncIQ® feature used by other applications, such as for replication.

In one implementation, work division and splitting is based upon hash values representative of the tree entries. For example, in OneFS®, a directory structure may have many entries comprising subfolders and files, each represented by a hash, in sorted order, whereby each directory comprising a set of entries may be represented by a list of hash values. The parallel tree walk may be based on the hash values, so as to go through all entries in the file system (or some sub-part thereof) to be backed up.

A set of APIs 108 (e.g., POSIX APIs) allows an application/process to obtain sorted hash values representative of the entries in the file system tree. Entries may be stored using the hash as the key in a B-Tree, with the inherent order in the directory entries based on the hash value of the entries. Entries can be retrieved in that order using an API call, e.g., using readdirplus( ) Each call returns a number of entries along with a cookie used for a next call, whereby a program that is handling entries to be processed can track those entries by storing the min and max hash value.

The coordinator 106 starts a worker process, e.g., $104_1$, to back up the root node of the tree (or some other starting node). One or more worker processes may be each assigned a set of hash values to process, e.g., via respective min and max hash values. The responsibility of each worker may be tracked by the coordinator. The coordinator may manage the work items as workers receive their respective directory slices via splitting, and complete their respective directory slices. This facilitates fault tolerance, because if the worker fails, the coordinator 106 can reassign the work item to another worker.

Each active worker maintains a stack of entries, with each entry being a min and max hash value of a directory slice for which that worker is responsible. As the worker walks down the tree from its lowest root node, the worker updates its stack as it finds the items to backup. If another worker process such as $104_2$ is available for work, the other worker process notifies the coordinator 106, which instructs a worker process (e.g., $104_1$) currently performing backup work to split its workload with the other available process (e.g., $104_2$).

With respect to splitting a work item to an idle worker, each worker is responsible for a slice at a particular directory level, as represented by a set of hash values. Because hash values represent the entries to be processed, slice-based min and max hash values can be split into two sets based on an intermediary hash value. More particularly, splitting the tree walk may be accomplished by finding an intermediary hash value between an entry's minimum and maximum value (associated with the entries that a worker process is currently responsible for backing up), e.g., via averaging/finding a midpoint as a split point. The top of the stack may be processed first to look for a directory slice to split, as starting at the top tends to better distribute the workload.

As a simplified example, a work item having a lowest hash value of ten (10) and a highest hash value of twenty (20) may be split at fifteen (15). In this example, the currently running worker process may then backup the entries having hash values between ten (10) and fifteen (15), with the newly available process assigned to backup the entries having hash values between sixteen (16) and twenty (20), for example (or vice-versa). Note that in an alternative implementation, it is feasible to divide the workload based upon more than one available worker process, e.g., if there are three other worker processes idle, a current work process may have its hash value range divided by four, keeping one and having the other three assigned to the other (now formerly available) worker processes.

Because the actual hash values between the lowest and highest hash values may not be distributed evenly, it is feasible for there to be no directory entries with hash values in a midpoint-split range, and, and hence no backup work for a worker process following a midpoint computation. In this instance, a secondary split (and so on if needed) may be performed, e.g., if there are no hash values between sixteen (16) and twenty (20), the work to be done again may be split, e.g., this time between ten (16) and twelve (12) to one worker process, and thirteen (13) and fifteen (15) to the other. A call to the API set—e.g., a call to POSIX API readdirplus( )—may determine when there is not any (directory) entry with a hash value in the range above the midpoint, for example. Further, the coordinator may be told that there is no work for a given worker to split, whereby the coordinator may use the idle worker to split the work of another worker process. However, given most distributions, there is typically some work for a worker process to do, and the workload thus tends to balance among the available worker processes. Thus, with multiple worker processes available, the parallel tree walk backup workload is quickly load balanced among the worker processes.

In one implementation, splitting may occur as follows:

Starting from the top of the stack of directory slices, try to split a slice. On finding a slice that can be split, split it and hand over one of the splits to the coordinator. If no slice can be split inform the coordinator that no work can be split off.

Trying to split a given slice (in the aforementioned action) may be accomplished by:

a. Assign directory slice to a hash space, H.

b. If H is not a singleton, find midpoint in H; otherwise the slice is not split-able.

c. If upper half is empty, discard it by updating H; go back to (b), otherwise update directory slice in the stack to reflect reduced work to done by this worker, and return the upper half as the split off work.

In this way, the directory tree walk is parallelized by using multiple worker processes. Any time a worker process does not have any work, the worker process requests work from the coordinator 106. As described above, work splitting is accomplished by taking away a slice of the directory from the process that is responsible for backing that part up, and giving that part of the work to the new process. Note that in one implementation, splits take place only occasionally or periodically, e.g., the coordinator only wakes up every sixty seconds to look for notifications from idle workers, which may be a time controlled by a backup administrator or the like.

Moreover, the coordinator may take into account whether there are idle storage devices (not just idle workers). To this end, when an idle worker contacts the coordinator for work, the coordinator only issues a split request to a busy worker if a new stream/storage device is also available for the idle worker. This situation is likely to occur when backing up a single large file that is split into multiple work items (as described below), because by the time the large file is encountered during the backup, all available backup devices may be busy.

As can be seen, backup may be efficiently performed by decomposing the backup task into subtasks that are run in parallel. While a full backup from some root node has been described, it is understood that parallel tree walking can be used with incremental backup, e.g., by not backing up unchanged entries.

Turning to the data storage performed by the worker processes, as used herein, a "stream" is a sequence of bytes that a worker process performing one work item of the directory tree walk sends to a set of backup storage devices 110. Such storage devices may be any storage media that can record a sequence of bytes, typically multiple hard disks, multiple tape storage devices, and so on that can be written in parallel.

Unlike prior solutions in which a single serial stream is generated for a directory tree walk, in one implementation of a backup solution as described herein, the multiple worker processes on different nodes simultaneously perform the tree walk, resulting in the generation of multiple streams 112. To differentiate and identify streams, a unique identifier (at least unique per backup operation), Stream ID, is assigned to each stream. For example, StreamsIDs may be based upon numbers starting from zero (0), with zero (0) being the Stream ID for the first process that starts the backup. In prior solutions, which basically have only a single original stream (analogous to StreamId=0), there is only one original stream that needs to be saved and restored upon a restore operation; as used herein, the equivalent "original" stream is what needs to be able to be restored following a restore operation; however, instead of one stream, restore may operate in parallel on parallel-backed up streams as described herein to restore the file data.

More particularly, because the parallel tree walk splits the original stream into multiple smaller streams, described herein is a recording of the relationship between the streams so that they can be stitched back together to recover the file data as if it was from one original stream, except the stitching may be performed in parallel. To this end, when work is split off from the process that is currently generating a stream, e.g., stream x with Stream ID=x, the parallel tree walk split generates a new stream, e.g., stream y with Stream ID=y, for the work that was split off. In one implementation, within the stream x identified as StreamID=x, a reference to StreamID=y is inserted such that upon replacing the reference with stream y, the resultant stream obtained is the same as what would have been obtained had there been no work split. In turn, stream y may be split during processing to generate a stream z (StreamID=z), and so on. Note that a stream may have multiple references to other streams therein, e.g., a worker that has its work split more than once will have a reference for each split.

Figure 2A:
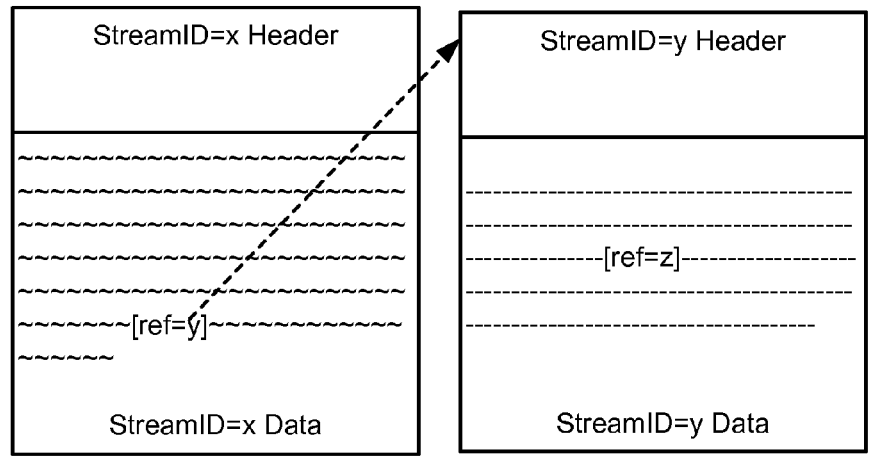
FIG. 2A is a representation of how a stream of parallel backed up data may reference another stream of parallel backed up data, according to one example embodiment.

Inserted references are represented in FIG. 2A. Any way of associating, inserting and/or identifying a reference, which can be within a stream, at the end of a stream and/or tracked by header information, may be used as long as the reference can be differentiated in some way from the file data. In the example of FIG. 2A, each file within a stream has a header, and a reference may be a dummy "file" or the like that indicates that it is actually a reference to another stream instead of an actual file. Other ways of inserting a reference into a data stream may be used. It is also feasible for the relationships between streams to be maintained external to the streams themselves, e.g., in a stream relationship data structure for this backup instance.

Figure 2B:
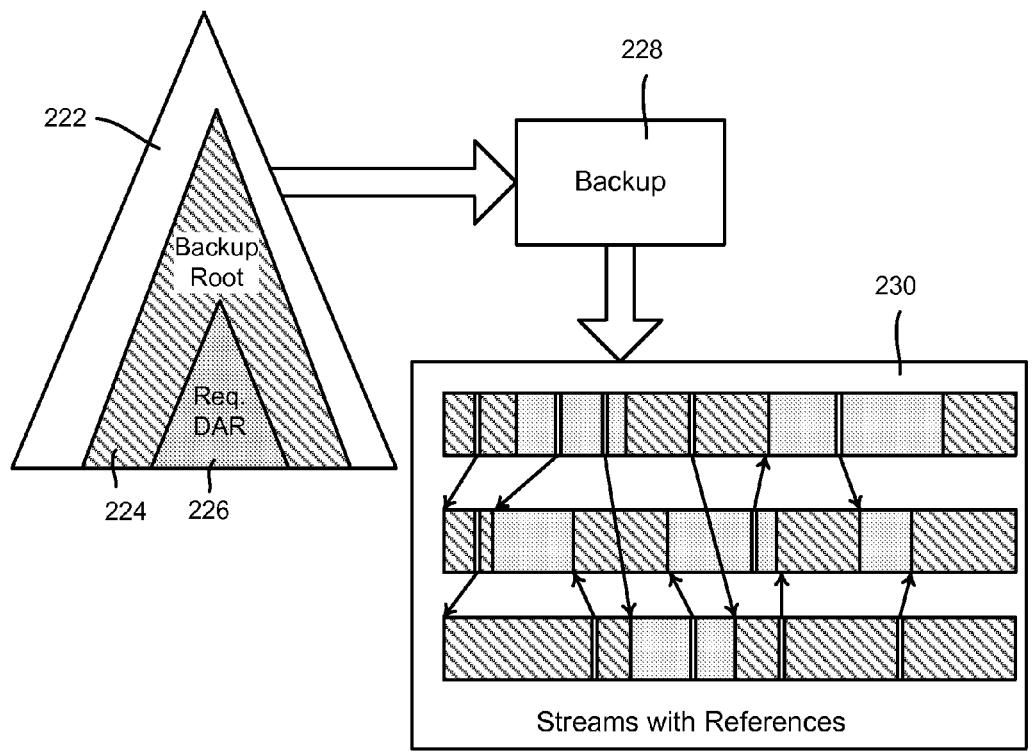
FIG. 2B is a representation of how various streams of parallel backed up data reference other streams of parallel backed up data, according to one example embodiment.

FIG. 2B is an example of how streams with inserted references may be stored in various locations. The full file system tree 222 may be restored, or a subset thereof, e.g., the striped area 224 represents the nodes under a selected root from which designated backup may occur. The shaded area 226 represents an example restore request (anytime after backup completes) corresponding to a smaller subset of the backed up subset 224, e.g., a requested Direct Access Restore of a subset of nodes (Req. DAR; restore is described below). With respect to backup, after at least some backup (block 228) stream writes, block 230 shows the shaded and striped regions representing multiple streams with the inserted references to other streams represented by the non-shaded stripes and associated arrows.

For each stream ID, when the corresponding stream is written to the backup device, the location of the stream is recorded in a data structure referred to as a stream location table 114 (FIG. 1). The stream location table 114 may be recorded on a separate backup device to allow for even more parallelism, e.g., a data management application can store the location table, along with a catalog that can store one or more sub-node offsets and other information, such as for selective restoring from a sub-node as described below. The stream location table 114 may be mirrored/replicated for greater protection against storage failures.

Figure 3:
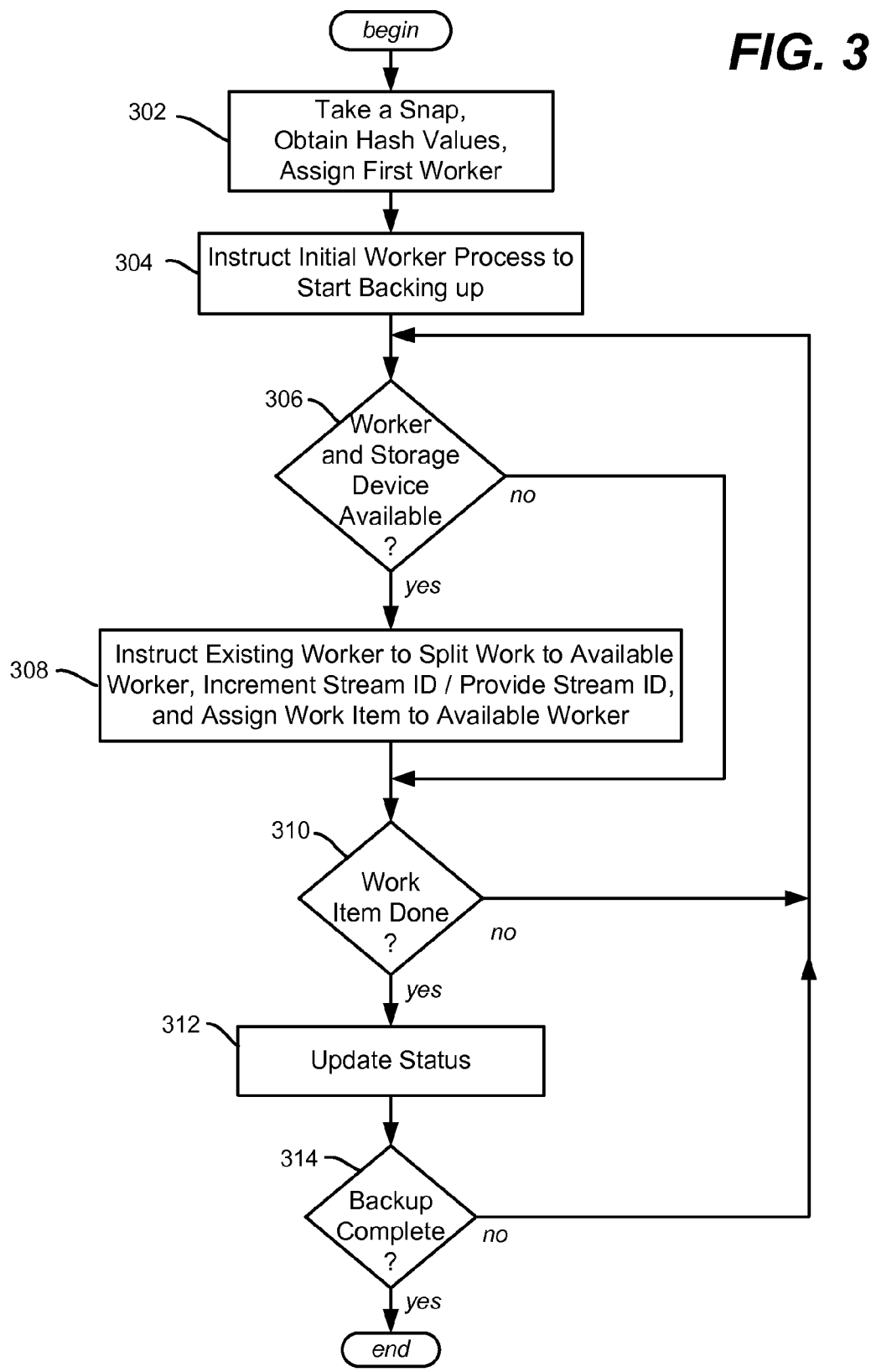
FIG. 3 is a flow diagram showing example steps that may be taken to coordinate a parallel backup operation, according to one example embodiment.
Figure 4:
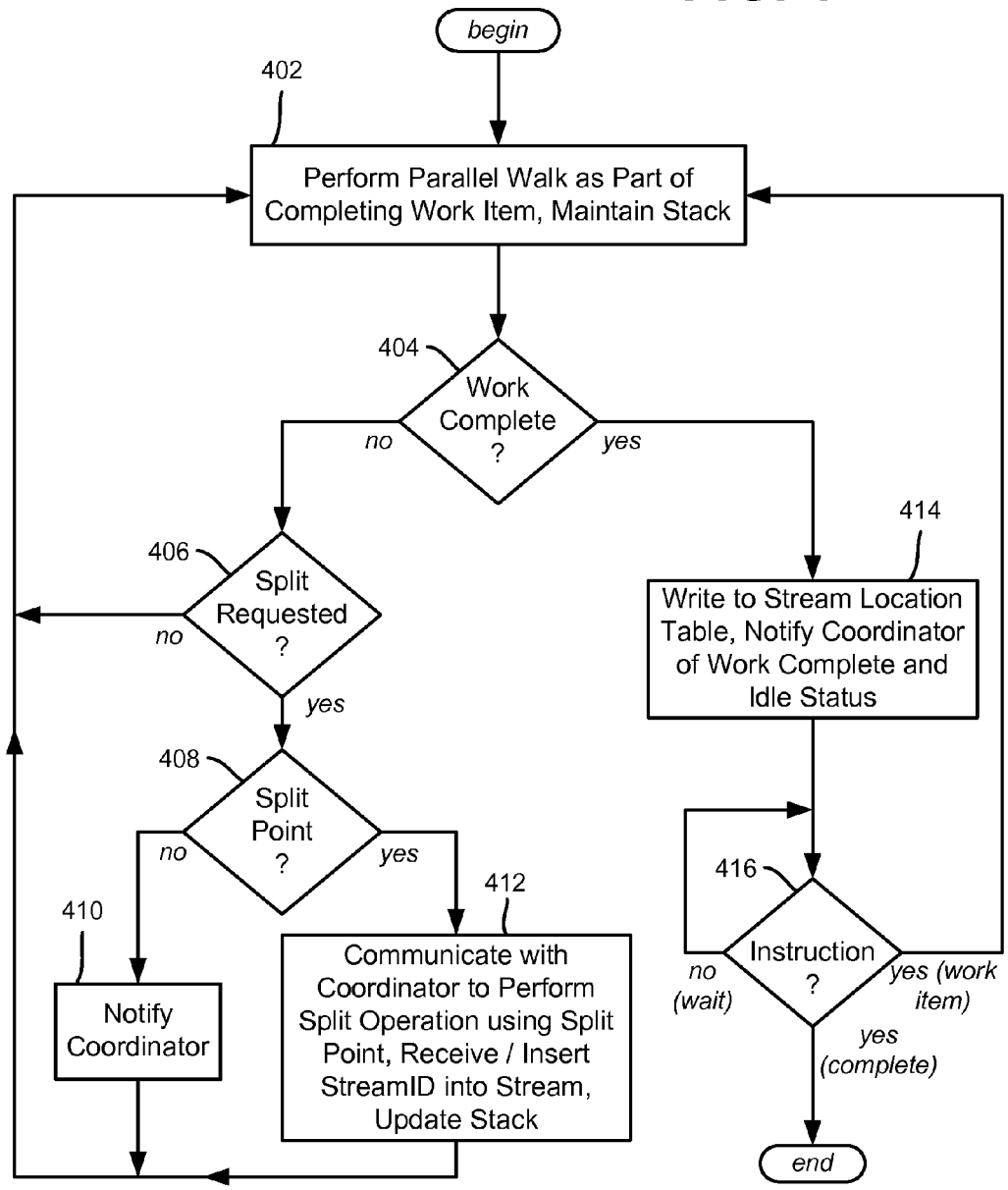
FIG. 4 is a flow diagram showing example steps that may be taken by a worker in a coordinated backup operation, according to one example embodiment.

FIG. 3 is a flow diagram representing some example steps involved in backup, e.g., including steps by the coordinator. FIG. 4 is a flow diagram representing some example steps involved in backup, e.g., including steps by the worker. Note that the steps need not occur in the order shown, nor need they be part of the same process, e.g., the coordinator's evaluation of whether a worker is available may be a separate process from the coordinator's handling a notification of the completion of a work item. Also, events and the like may trigger some of the steps, rather than completion of a previous step.

Step 302 represents taking the snap and assigning the first worker with a work item, e.g., corresponding to the entire tree to backup, which may be the whole file system or a specified a subpart thereof. Step 304 represents the instructing the initial worker to begin the backup. Note that in a typical case, a directory that needs to be backed up along with all its "descendents" is specified here. In that case, the obtaining of hash values in step 304 is trivially the lowest and highest possible hash values permitted. For instance if the hash values are represented by 32 bits then the hash values for the slice for that directory are 0 and ffffffff (in hexadecimal).

Step 306 evaluates whether an idle worker process and storage device/new stream are available to take some split off entries in a new work item; the coordinator may wake up periodically to perform this evaluation. As can be readily appreciated, initially there will be idle workers; however later during the backup there may not always be an idle worker, which is shown via the branch from step 306 to step 310. Note that any information to be provided to the coordinator may be cached until the coordinator wakes up, (or the coordinator may always be awake, but only trigger splitting at a desired time).

Step 308 occurs when a worker is idle or one becomes available, and represents the coordinator instructing the current worker to find a split and perform the split operation as described herein. The existing worker is given the StreamId of the new split (incremented for each split by any worker) as part of the split operation, for inserting into the current stream. As another part of the split operation, a new work item assigned to the previously idle worker via the coordinator, as also represented in step 308. Although not shown, a worker may not be able to split its work (e.g., particularly as a worker nears completion of a work item), whereby the coordinator may select another current worker to split work off to the idle worker as described above; it is also understood that eventually no split may be found for any idle worker (e.g., particularly as the overall backup process nears completion), whereby a work item is not assigned nor is the Stream Id incremented at step 308.

Step 310 represents evaluating whether a worker has notified the coordinator that a work item is done. If a work item is not done, step 310 returns to step 306 where another worker can be assigned a work item if idle, or the coordinator waits until a worker becomes available when a work item is done, at a controlled splitting time. If a work item is done, step 312 updates the overall backup work status tracked by the coordinator to ensure that the stream write is successful, e.g., for fault tolerance, a failed worker's assigned work may be reassigned. The stream location table is also written to persist the location of the stream (this may be done by the worker as long as the coordinator knows the worker has successfully done so). Note that by indicating that the work item is done, the worker has also notified the coordinator of its idle status, and this worker may now be assigned work split from another worker. Step 314 ends the backup operation when no work items remain to be assigned/split, e.g., as indicated in the status data maintained by the coordinator.

FIG. 4 represents example steps that may be taken by a worker to process a work item, beginning at step 402 which represents the depth first walking, including to set up the stack with the min hash, max hash entries for which that worker is responsible for backing up. The walking and processing/stream writing as part of completing a work item continues until the work is complete (step 404) or a split is requested (step 406) by the coordinator.

If a split is requested, step 406 branches to step 408 where the worker looks for a split point, e.g., one in which at least one hash value exists to split off to another worker. If none can be found, e.g., after attempting secondary (or further) splitting, the worker notifies the coordinator at step 410.

If a split is found, step 412 represents performing the split, e.g., including communicating with the coordinator to insert the Stream ID (provided by the coordinator at step 308 of FIG. 3) into the current stream, updating the stack to reduce the work for which the worker is responsible and passing that information along with the work split off to the coordinator for reassigning. The worker then continues to work by returning to step 402 to perform further backup work (the backup work which was not split off).

The worker continues to work and handle any splits until the work is complete, as evaluated at step 404. When the work is complete, the worker writes the stream location table and notifies the coordinator at step 414, which also indicates the worker's now idle status. Step 416 represents waiting for a further instruction from the coordinator, until new work is assigned (e.g., via a split) or the coordinator indicates the backup is complete, at which time the coordinator (or the worker itself) can end the worker process.

Figure 5:
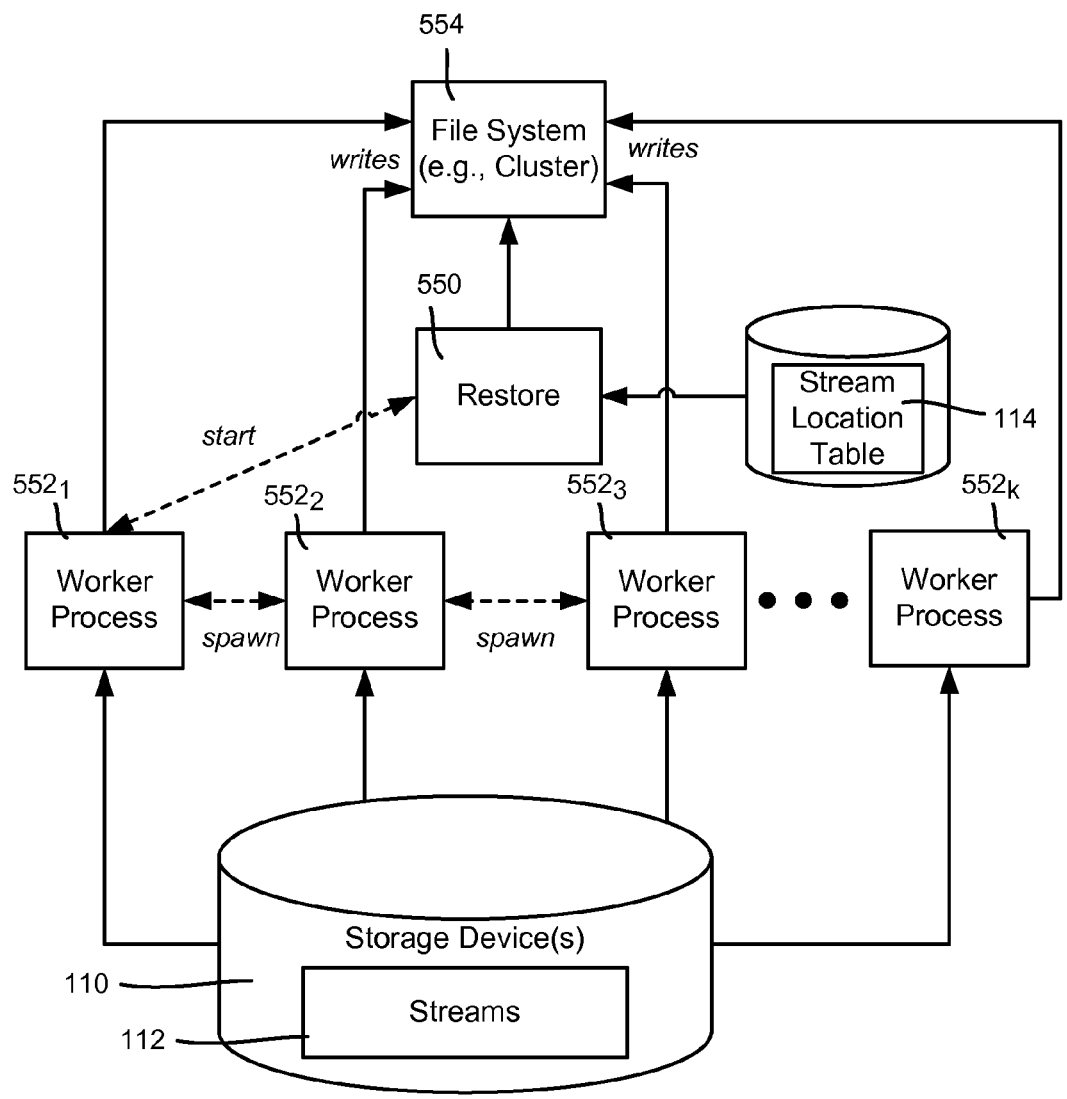
FIG. 5 is a block diagram showing various example components that may be used to parallelize restore of a file system, according to one example embodiment.

Turning to restore, FIG. 5 represents the restore operation, which may be initiated by having a restore process 550 spawn a worker process (e.g., $552_1$) to begin the restore from the initial stream, stream 0. Note that the restore process 550 also may act as the initial worker process. The stream location for any stream including stream 0 may be found via the stream location table 114.

While processing a stream to recover the data, on encountering a reference to another stream, the worker process that encountered the reference (or possibly the restore process via communication with the worker process) spawns a new worker process, e.g., $552_2$, whereby the newly spawned process begins recovering data recover from the newly referenced stream. Note that although not shown, any spawned worker processes may be passed the location of the stream location table, or the location of the stream itself, as well as the write location to the (e.g., cluster) file system 554 to begin recovering data. This strategy of spawning a new process each time a reference to a stream is encountered allows for parallel restore. Note that because of the way the backup stream was generated, any time a node is restored, its ancestors in the directory tree already have been restored. Upon completion of writing back the data of each stream, the file system 554 is restored.

Note that metadata generation does not add much to the backup process, and in this implementation stitching is postponed to restore time. Although there is an inherent tradeoff as to whether to burden the backup operation or the restore operation with the overhead of stitching, backup is far more frequent than restore, and thus restore performs the bulk of the stitching overhead in one implementation.

Further note that instead of a full restore, parallel selective restore of a sub-tree of the tree that is backed up may be performed. To this end, a selective restore begins from an offset into the stream at which the directory (at which the sub-tree is rooted) is located. The needed starting location information may be made available during selective restore by recording the location during the backup via a data management application or the like.

Turning to another aspect, namely handling large files, it often is desirable to parallelize the backup of individual files. For example, if the directory tree primarily contains a few very large files, then the scalability of the backup may be limited by the number of such files. For instance, in the extreme case where there is only a single very large file in the directory tree, the backup and restore again become completely sequential as only one worker can perform the tree walk, unless parallelized file backup is also performed.

In OneFS® (and sometimes in other systems), files are striped across multiple cluster nodes, e.g., with a stripe size of 128 k. If the file size is greater than a certain size, then the process backing up the file may send messages to the nodes on which the file resides, requesting them to backup the data residing on them using a parallel technique. For each node, a new stream ID is generated; (as described below, there may be more than one stream/stream ID per node). The process responsible for backing up the file inserts a merge instruction into the stream, so that by referencing the new stream IDs, restore is later able to merge the streams being generated. Restore as described above can be trivially enhanced to handle this new kind of instruction in the backup stream. This procedure for restore guarantees perfect "affinity" for files that are striped across nodes; all nodes serve data residing locally.

More generally, let n be the number of nodes across which the file is striped. N streams are generated during backup, where N is a multiple of n, which allows for sufficient parallelism. The file stripes may be "striped across" the N streams, where the stripe size equals the data size on one node (e.g., 128K). Processes may be spawned on the nodes owning the data to allow perfect affinity.

Figure 6:
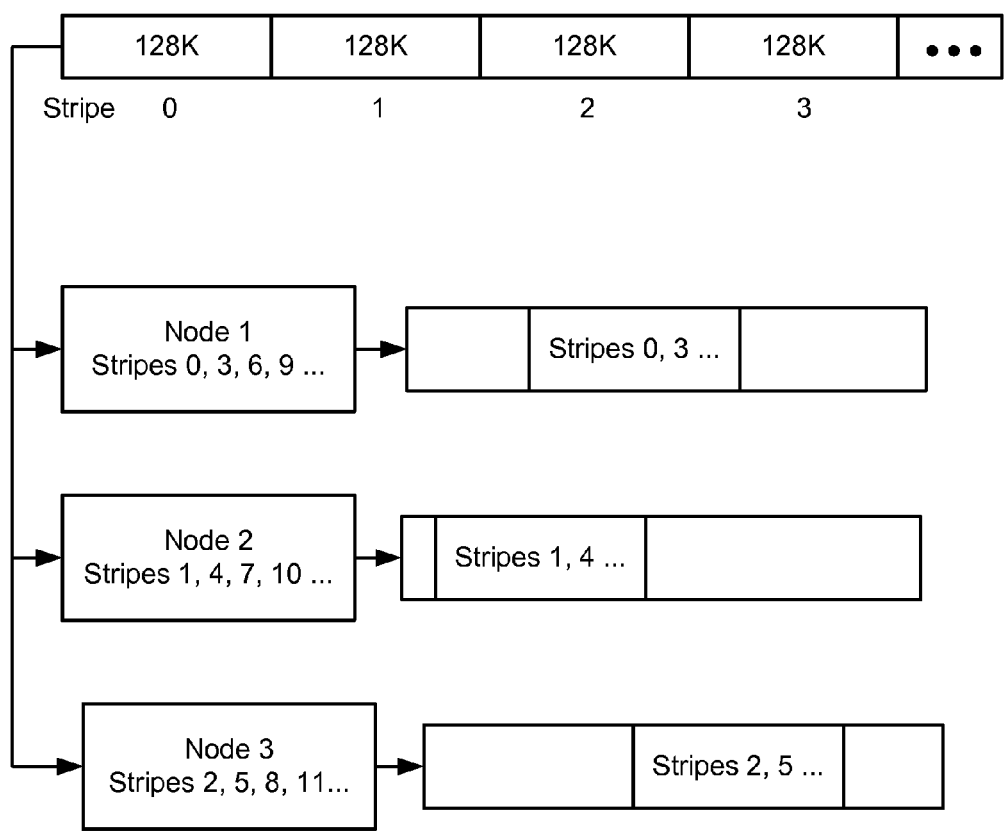
FIG. 6 is a representation of how a file that is striped across multiple nodes may be backed up in parallel into various streams, according to one example embodiment

By way of example, FIG. 6 shows a large file striped across three nodes Node1-Node 3. In this example, only three streams are to be generated, one for each node. As can be seen, stripes 0, 3, 6, 9 and so on are stored on node 1, stripes 1, 4, 7, 10 and so on are stored on Node 2, and stripes 2, 5, 8, 11 and so on stored on Node 3. During backup, stream IDs are generated for each of the N streams (three in this example) and an instruction inserted in the current stream for merging the new streams in the appropriate order. The backup process spawns N processes divided among the appropriate nodes, one per stream.

If instead N were six streams with n equal to three nodes, then six streams/stream IDs are generated, with two processes spawned per node for generating the streams. For example, one process may handle every other stripe, e.g., a first process on node 1 may handle the streaming of stripes 0, 6, 12 and so on, with the second process on node 1 handling the streaming of stripes 3, 9, 15 and so on. Alternatively, it may be more efficient to have the total size of the stripes on a node divided by the number of processes per node, e.g., if there were thirty stripes (0 through 29), process one may handle stripes 0 through 14 writing to one stream, and process two (on the same node) may handle stripes 15 through 29 writing to another stream. Indeed, the number of processes may be proportional to the number of stripes that a node needs to stream.

The distribution of data of a large file among multiple streams may depend on the file protection, and to avoid moving data across internal network, the software may only get blocks of data from local disks. Maintaining node affinity is desirable. The reason there may be a pattern such as 0, 3, 6, 9, . . . is that the model for the cluster storage may be relatively straightforward, with the parities stored in separate nodes. One benefit is to avoid complicated stripe computation since file system may have restriping in process.

The same approach can be applied to situations as described herein where one or more nodes are used for storing the parity, and keep rotating (as described in the example below, where the parity stripe rotates left). In that scenario, the stripes being backed by a node are different and therefore the node affinity still exists. Notwithstanding the examples herein, the same set of stripes is not necessarily backed by each node, even in a scenario where the location of the parity rotates. For example, if a file is striped across four nodes instead of three, node 0 will not back up stripes 0, 3, 6, 9 . . . as exemplified in FIG. 6; instead, as can be readily appreciated, the set of stripes that is backed are going to be figured out based on the specific distribution. The idea described herein is applicable to a "rotating scenario" while maintaining node affinity.

Moreover, sparse files may use an optimization, and such optimizations may be extended to the framework described herein. To this end, there may be a sparse map for each sparse file backed up, e.g.:
<num entries>
<offset><size>
<offset><size>
. . .

The map may be inserted between the header of the file and the actual data of the file. Only blocks with data are backed up, with the sparse map used to read from backup stream and restore data to correct locations.

The sparse map concept may be used to back up a large file into multiple streams. Each steam has part of the file, and a sparse map can be used to identify the offset and size of the data in the stream. The sparse map may be constructed by calling an API, e.g., snapdiff, which returns regions. Each region has type, offset, and size. The type can be sparse (no data), data (has changed data), unchanged (has old data).

Backing up a large file using multiple streams may need to consider file protection. The file system maintains parity blocks or mirror (duplicated) blocks for protection. In one implementation, backup skips those parity or mirror blocks. Thus, the blocks backed up by a stream may not be in a well-defined order (e.g., 0, 3, 6, 9, . . . ).

In the following example, the file data is spread over three nodes including parity blocks. Labels starting with the letter "D" represent data strips of the file and labels starting with "P" represent parity stripes (or error correcting codes) for the data stripes in the same row:

| Node1 | Node2 | Node3 |
|-------|-------|-------|
| D0    | D1    | P0    |
| D2    | P1    | D3    |
| P2    | D4    | D5    |
| D6    | D7    | P3    |
| D8    | P4    | D9    |
| P5    | D10   | D11   |
| . . . | . . . | . . . |

Thus, if the file with three streams is backed up, stream1 will have D0, D2, D6, D8, . . . , stream2 will have D1, D4, D7, D10, . . . and stream3 will have D3, D5, D9, D11, . . . . Each stream will have its own sparse map to indicate offset and size of data being backed up for that stream.

Note that as set forth above, there may not be available storage devices even when workers are idle, particularly when a single large file is split into multiple work items (because by the time the large file is encountered during the backup all backup devices may be busy). In this situation, the coordinator assigns the subtasks for the large file as the storage devices become available. Note that the worker that encounters the large file does not need to wait for the resulting work items to get scheduled, and instead writes a merge instruction with the new stream identifiers (for the resulting work items) and continues with its tree walk. When the new work items for the large file are completed, the stream location table is updated with the location of the streams created for the large file.

During restore, on encountering the merge instruction, restore may spawn N processes that restore each stream.

As can be seen, there is described using stream IDs, references to streams and a stream location data structure for storing the location of streams to enable independent backup and restore of streams that result from the parallel division and storage of the original stream. This enables parallelization of backup and restore, which is desirable for efficiently scaling up to current scale out NAS solutions. Because of the way that the work/tree walk is partitioned, no two processes perform the same work, and no work is left over.

Turning to another aspect, the technology described herein may be further enhanced to support fault tolerance of the maintained data. For example, if there are m target devices with backup data, error correcting codes may be computed for data on the m devices and stored on one or more additional target devices. If a target device stops working such that at least one stream is lost or corrupted, the content on that device may be reconstructed via the error correction codes from another device. A protection policy may be followed that specifies how many additional target devices will be there for error correction, and thereby establishes how many errors are recoverable.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
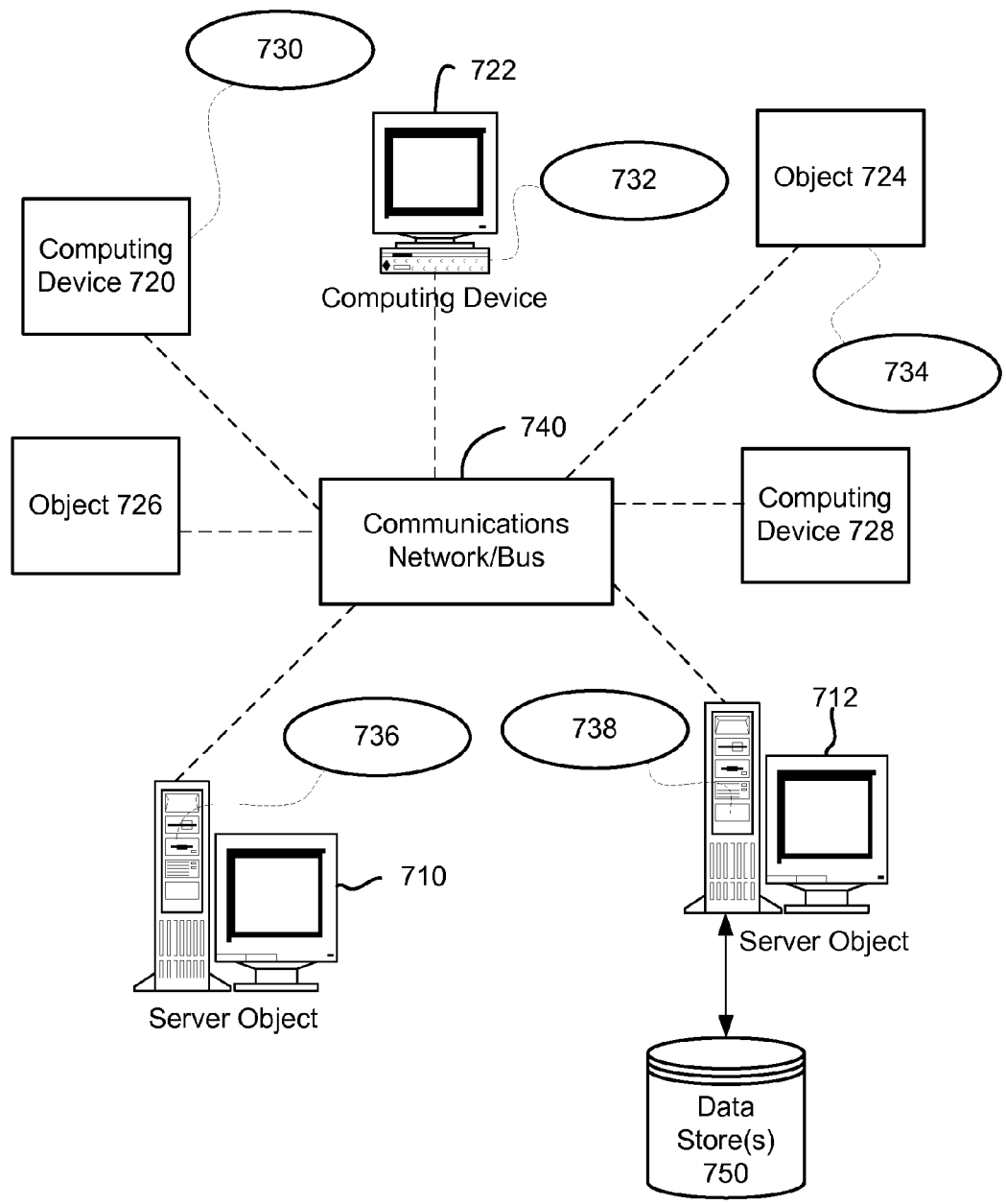
FIG. 7 is a block diagram representing example non-limiting networked environments in which various embodiments described herein can be implemented.

FIG. 7 provides a schematic diagram of an example networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
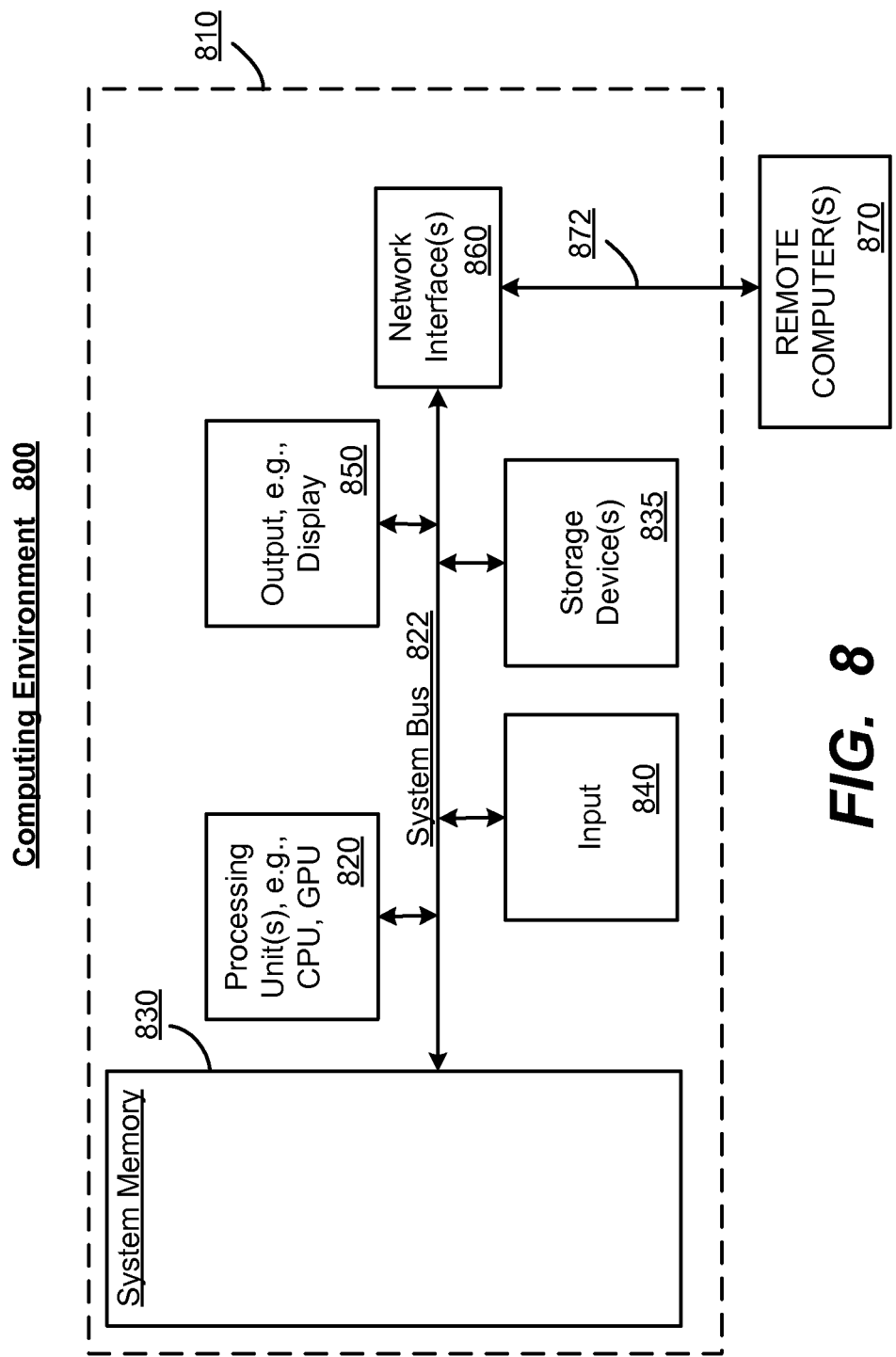
FIG. 8 is a block diagram representing an example non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the example computing system environment 800.

With reference to FIG. 8, an example remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data. One or more storage devices 835 (e.g., drives) may be coupled to the computer 810.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary," if used herein, means serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method for backing up at least part of a file system represented by a tree structure, the method comprising:
   distributing work to workers to walk parts of the tree structure in a parallel tree walk, the workers generating multiple streams;
   writing file system data for backing up the at least part of the file system represented by the tree structure to data storage devices in parallel streams of the multiple streams, distributing the work to the workers comprises:
   identifying a work item assigned to a first worker; and
   splitting the work item assigned to the first worker between the first worker and a second worker based on whether the second worker is idle and whether a data storage device is idle, wherein splitting the work item comprises identifying an intermediary hash value, assigning the first worker a first set of hash values to process based on the intermediary hash value, and assigning the second worker a second set hash to process based on the intermediary hash value, wherein the first set of hash values and the second set of hash values each comprises a respective minimum hash value and a respective maximum hash value; and persisting relationship data that maintains relationships between the streams and location data that maintains storage locations of the streams, further comprising:

assigning a first stream identifier to the first stream;

assigning a second stream identifier to the second stream; and inserting a reference to the second stream identifier into the first stream.

2. The method of claim 1 wherein splitting the work item comprises instructing the first worker to write file system data corresponding to a split work item to a first data storage device associated with the first stream, determining whether a second data storage device is idle, and instructing the second worker to write file system data corresponding to the split work item to the second data storage device associated with the second stream.

3. The method of claim 2 wherein distributing the work to workers comprises starting with a single worker and a single work item before splitting the work item to the second worker, wherein the data storage device is a first data storage device and wherein splitting the work item further comprises:

splitting the work item assigned to the first worker between the first worker and the second worker based on whether a second data storage device for the second worker is idle.

4. The method of claim 2 wherein splitting the work item comprises providing, to the second worker, a reference to the first stream to be written by the first worker.

5. The method of claim 1 further comprising, restoring at least part of the file system based upon the streams, including processing a stream with a restore worker, and spawning another restore worker upon encountering a reference in the stream, the other restore worker processing another stream corresponding to the reference.

6. The method of claim 1 further comprising, backing up portions of a file in parallel, including writing a plurality of streams for persisting file data of the file, and using at least one merge instruction for reassembling the file data upon restore.

7. The method of claim 6 wherein the portions of the file comprise blocks of file data striped across a plurality of nodes, and wherein writing the plurality of streams comprises running at least one worker on each node.

8. The method of claim 6 further comprising, restoring the file based upon the streams and the at least one merge instruction.

9. The method of claim 1 further comprising:

splitting a work item assigned to the second worker between the second worker and a third worker;

assigning a third stream identifier to a third stream generated by the third worker; and inserting a reference to the third stream identifier into the second stream.

10. The method of claim 1 further comprising determining whether a first part of the file system is changed, wherein the first part of the file system is backed up when the first part of the file system is changed, and wherein the first part of the file system is not backed up when the first part of the file system is not changed.

11. In a computing environment, a system comprising:
one or more processors;
a coordinator; and
a plurality of workers implemented on the one or more processors, the coordinator configured to identify a work item assigned to a first worker, and split the work item assigned to the first worker between the first worker and a second worker based on whether the second worker is idle and whether a data storage device is idle, the workers configured to operate in parallel to backup file system data to storage in a plurality of streams, wherein splitting the work item comprises identifying an intermediary hash value, assigning the first worker a first set of hash values to process based on the intermediary hash value, and assigning the second worker a second set hash to process based on the intermediary hash value, wherein the first set of hash values and the second set of hash values each comprises a respective minimum hash value and a respective maximum hash value, the plurality of workers configured to walk directory slices of a file system tree as assigned by the coordinator to write a stream corresponding to a directory slice to the storage, and to split off a subpart of a directory slice as directed by the coordinator to another worker, the system configured to maintain relationship data between the streams, the first worker generating a first stream, the second worker generating a second stream, the system further configured to insert a reference to a stream identifier associated with the second stream into the first stream, and to maintain stream location data.

12. The system of claim 11 wherein the coordinator is configured to start a single worker with a directory slice corresponding to an entire directory to be backed up, and is further configured to instruct the single worker to split off a subpart of the directory slice to another worker.

13. The system of claim 11 wherein a stream written by a worker includes a reference to another stream, in which the other stream resulted from the worker splitting off a subpart of a directory slice reference to another worker.

14. The system of claim 11 wherein the coordinator is further configured to split a work item assigned to the second worker between the second worker and a third worker and assign a third stream identifier to a third stream generated by the third worker, wherein a reference to the third stream identifier is inserted into the second stream.

15. The system of claim 11 further comprising node workers configured to split a file into a plurality of file streams, each file stream written by a node worker on one node operating in parallel with at least one other node worker on another node.

16. The system of claim 15 wherein the coordinator provides the node worker with a stream identifier for use in maintaining the relationship data as part of a merge instruction for merging the file streams during a subsequent restore operation.

17. The system of claim 11 further comprising a restore mechanism implemented on one or more processors, the restore mechanism configured to access the stream location data to restore file data from a starting stream, and to spawn a restore worker for each reference to another stream encountered in the starting stream for parallel restore of the file data from each other stream.

18. One or more computer storage devices having computer-executable instructions, which, when executed, perform operations comprising, walking all or part of a file system tree in a depth first walk for writing a first stream that includes file system data to backup storage by a first worker;

splitting off a subpart of the tree to a second worker to walk for writing a second stream corresponding to the subpart that includes file system data to a storage device based on whether the storage device is idle, wherein splitting the work item comprises identifying an intermediary hash value, assigning the first worker a first set of hash values to process based on the intermediary hash value, and assigning the second worker a second set hash to process based on the intermediary hash value, wherein the first set of hash values and the second set of hash values each comprises a respective minimum hash value and a respective maximum hash value;

inserting a reference to a second stream identifier within the first stream, the second stream identifier assigned to the second stream; and persisting stream location data of the first stream.

19. The one or more computer storage devices of claim 18 having computer-executable instructions, which, when executed, perform operations comprising, splitting off another subpart of the tree to a third worker to walk for writing a third stream corresponding to the other subpart, and inserting a reference to the third stream within the first stream.

20. The one or more computer storage devices of claim 18 having computer-executable instructions, which, when executed, perform operations comprising, after persisting the stream location data of the first stream, entering an idle status until assigned a work item associated with a splitting off operation.

* * * * *